(12) United States Patent
Sandman et al.

(10) Patent No.: US 7,523,964 B2
(45) Date of Patent: Apr. 28, 2009

(54) SEALING GASKET FOR VENTILATION DUCT SYSTEM

(75) Inventors: Michael N. Sandman, Morrow, OH (US); Joseph P. Sandman, Morrow, OH (US)

(73) Assignee: Langdon Incorporated, Cincinnati, OH (US)

( * ) Notice: Subject to any disclaimer, the term of this patent is extended or adjusted under 35 U.S.C. 154(b) by 355 days.

(21) Appl. No.: 11/088,541

(22) Filed: Mar. 24, 2005

(65) Prior Publication Data

US 2006/0214423 A1    Sep. 28, 2006

(51) Int. Cl.
    *F16L 17/00*    (2006.01)
(52) U.S. Cl. .................. 285/110; 285/910; 277/616
(58) Field of Classification Search ............. 285/347, 285/370, 345, 910, 110; 277/608, 609, 616, 277/625, 630, 631
    See application file for complete search history.

(56) References Cited

U.S. PATENT DOCUMENTS

| | | | |
|---|---|---|---|
| 193,847 A | 8/1877 | Choate | |
| 210,367 A | 11/1878 | Stern et al. | |
| 244,720 A | 7/1881 | Hildebrandt | |
| 409,631 A | 8/1889 | Cooper | |
| 735,644 A | 8/1903 | Wirtz | |
| 904,199 A | 11/1908 | Harris | |
| 910,119 A | 1/1909 | Dunn et al. | |
| 997,072 A | 7/1911 | Mares | |
| 1,083,002 A | 12/1913 | Charls | |
| 2,271,777 A * | 2/1942 | Nathan | 277/615 |
| 2,392,220 A | 1/1946 | Bruhn et al. | |
| 2,482,558 A | 9/1949 | Scaringella | |
| 2,535,186 A | 12/1950 | Anderson | |
| 2,818,084 A | 12/1957 | Tennison, Jr. | |
| 2,823,703 A | 2/1958 | Nusser, Jr. | |
| 3,081,102 A | 3/1963 | Murray et al. | |
| 3,111,922 A | 11/1963 | Hock | |
| 3,290,066 A | 12/1966 | Primich et al. | |
| 3,327,945 A | 6/1967 | Pfister | |
| 3,368,830 A | 2/1968 | French | |

(Continued)

FOREIGN PATENT DOCUMENTS

AT    363743    8/1981

(Continued)

OTHER PUBLICATIONS

Lindab AB, *Product Catalog* entitled "Ducts and Fittings", Caswell Road, Brackmills Industrial Estate, Northampton NN4 0BR, 1987.

*Primary Examiner*—Aaron M Dunwoody
(74) *Attorney, Agent, or Firm*—Wood, Herron & Evans, LLP

(57) ABSTRACT

A sealing gasket for a ventilation duct system includes an annular gasket body and a pair of annular sealing flanges extending radially outwardly from the gasket body. The sealing gasket has, in axial cross-section, a generally flat top wall and a curved or, alternatively, a radiused bottom wall. One of the sealing flanges is positioned adjacent one circumferential edge of the sealing gasket and the other sealing flange is positioned axially spaced from or offset from the opposite circumferential edge of the sealing gasket. The sealing gasket is provided to form a generally air-tight seal between overlapping ends of first and second components of a ventilation duct system.

29 Claims, 3 Drawing Sheets

U.S. PATENT DOCUMENTS

| | | | |
|---|---|---|---|
| 3,829,107 A * | 8/1974 | Machado et al. | 277/615 |
| D234,462 S | 3/1975 | Ahlrot | |
| 3,955,834 A | 5/1976 | Ahlrot | |
| 4,007,941 A | 2/1977 | Stancati | |
| 4,050,703 A | 9/1977 | Tuvesson et al. | |
| 4,186,932 A | 2/1980 | Emhardt et al. | |
| 4,216,981 A * | 8/1980 | Jensen | 285/110 |
| 4,288,111 A | 9/1981 | Feutz | |
| 4,303,103 A * | 12/1981 | Marks et al. | 285/370 |
| 4,368,894 A | 1/1983 | Parmann | |
| 4,379,559 A * | 4/1983 | Bohman | 277/615 |
| 4,602,793 A | 7/1986 | Andrick | |
| D289,078 S | 3/1987 | Vassallo et al. | |
| 4,666,165 A * | 5/1987 | Nordin | 277/616 |
| 4,789,167 A * | 12/1988 | Housas | 277/616 |
| 4,850,621 A | 7/1989 | Umehara | |
| 4,902,049 A | 2/1990 | Umehara | |
| 4,997,212 A | 3/1991 | Burkit | |
| 5,340,125 A | 8/1994 | Brown et al. | |
| D356,456 S | 3/1995 | Henry | |
| 5,407,122 A | 4/1995 | Stefansson et al. | |
| D360,018 S | 7/1995 | Sonden et al. | |
| D360,020 S | 7/1995 | Sonden et al. | |
| D360,021 S | 7/1995 | Sonden et al. | |
| D361,829 S | 8/1995 | Sonden et al. | |
| D362,299 S | 9/1995 | Sonden et al. | |
| D362,300 S | 9/1995 | Sonden et al. | |
| D368,516 S | 4/1996 | Matsumura | |
| 5,531,460 A | 7/1996 | Stefansson et al. | |
| D377,829 S | 2/1997 | Andresen | |
| D383,195 S | 9/1997 | Sonden et al. | |
| D386,246 S | 11/1997 | Sonden et al. | |
| 5,687,976 A * | 11/1997 | Andrick et al. | 277/607 |
| D391,628 S | 3/1998 | Carwile | |
| D427,667 S | 7/2000 | Stout, Jr. | |
| D427,668 S | 7/2000 | Stout, Jr. | |
| D427,673 S | 7/2000 | Stout, Jr. | |
| D430,482 S | 9/2000 | Stout, Jr. | |
| D435,090 S | 12/2000 | Stout, Jr. | |
| D437,034 S | 1/2001 | Stout, Jr. | |
| 6,170,883 B1 | 1/2001 | Mattsson et al. | |
| D446,298 S | 8/2001 | Thurman | |
| D447,223 S | 8/2001 | Mattsson et al. | |
| D456,071 S | 4/2002 | Mattsson et al. | |
| 6,431,609 B1 | 8/2002 | Andersson | |
| 6,460,896 B1 * | 10/2002 | Stephens et al. | 285/345 |
| D466,652 S | 12/2002 | Thurman | |
| D475,130 S | 5/2003 | Stout, Jr. | |
| 6,561,522 B1 * | 5/2003 | Radelet et al. | 277/628 |
| D475,447 S | 6/2003 | Stout, Jr. | |
| D475,448 S | 6/2003 | Stout, Jr. | |
| D475,449 S | 6/2003 | Stout, Jr. | |
| D475,778 S | 6/2003 | Stout, Jr. | |
| D475,779 S | 6/2003 | Stout, Jr. | |
| D475,780 S | 6/2003 | Stout, Jr. | |
| D476,074 S | 6/2003 | Stout, Jr. | |
| 6,719,302 B2 * | 4/2004 | Andrick | 277/604 |
| D498,826 S | 11/2004 | Takahiro et al. | |
| D501,547 S | 2/2005 | Stout, Jr. | |
| D501,548 S | 2/2005 | Stout, Jr. | |
| D504,503 S | 4/2005 | Thurman | |

FOREIGN PATENT DOCUMENTS

| | | |
|---|---|---|
| DE | 856283 | 11/1952 |
| DE | 954146 | 12/1956 |
| GB | 317678 | 8/1929 |
| GB | 442751 | 2/1936 |
| GB | 1403744 | 8/1975 |
| GB | 1429220 | 3/1976 |
| GB | 2149040 | 6/1985 |
| SE | 13987 | 7/1973 |
| SE | 19819 | 6/1975 |
| SE | 17788 | 12/1975 |
| SE | 382675 | 2/1976 |
| SE | 25473 | 3/1979 |
| SE | 25610 | 8/1979 |
| SE | 26059 | 11/1979 |
| SE | 26995 | 11/1979 |

* cited by examiner

SEALING GASKET FOR VENTILATION DUCT SYSTEM

CROSS-REFERENCE

The present application is related to U.S. Design Serial No. 29/226,158 (now U.S. Pat. No. D534,253), U.S. Design Serial No. 29/226,140 (now U.S. Pat. No. D529,598), and U.S. Design Serial No. 29/226,157 (now U.S. Pat. No. D521,147), each filed on even date herewith.

FIELD OF THE INVENTION

The present invention relates generally to ventilation duct systems and, more particularly, to a sealing gasket for use in such duct systems to form a generally air tight seal at the joints of the ventilation duct components.

BACKGROUND OF THE INVENTION

In ventilation duct systems, sealing gaskets are oftentimes used to provide a generally air-tight seal at the joints of the various ventilation duct components. In known sealing systems, an elastic sealing gasket or ring, typically made of rubber, is positioned in a groove about one or both connection ends of a fitting, and the fitting is then inserted into receiving ends of the duct runs for connecting and branching the ventilation duct system. The sealing gasket has one or more sealing flanges that extend radially outwardly from the connection end of the fitting and engage the inside surface of the receiving end of a duct run into which the fitting is inserted to form a seal.

One example of a known sealing gasket used in ventilation duct systems comprises a double-lip seal having a U-shaped cross-section. The sealing gasket is anchored in a circumferential groove formed in one or both ends of the fitting. The sealing gasket has a central web that is applied against the outside surface of the fitting and is fastened by a clamping ring that is placed onto the web of the sealing gasket and then tightened. The clamping ring is then anchored by spot welding. The sealing gasket has two sealing flanges that project radially outwardly on opposite sides of the clamping ring. The sealing flanges are bent sideways when the fitting is inserted into the end of the duct run so that a sealing effect is achieved by engagement of the sealing lips with the inside surface of the duct run end. Fasteners, such as screws, are driven through the receiving ends of the duct runs and the connection ends of the fittings to secure the components together.

While the double-lip seal described above provides an effective seal at the joints of the ventilation duct system, this sealing system is oftentimes difficult and labor intensive to install on the ends of the fittings and requires multiple parts to form and anchor the sealing gasket to the fitting which increases cost.

Another problem oftentimes encountered in known ventilation ducts systems is leakage of air at the locations of the fasteners which then escapes from the joints. While the fasteners typically include washers or gaskets so as to form an air-tight seal at the holes formed though the outer ends of the duct runs, the holes formed through the inner connection ends of the fitting are susceptible to air leakage. Air leaking through these holes migrates through the annular gap formed between the components and then escapes from the joint. Thus, while the sealing gaskets provide a generally air-tight seal at the joints of the ventilation duct components, the sealing gaskets are not positioned to provide any sealing effect to minimize or eliminate air leakage from the joints caused by the fastener holes.

Thus, there is a need for an improved sealing gasket that overcomes these and other shortcomings and drawbacks of known sealing gaskets for use in ventilation duct systems.

SUMMARY OF THE INVENTION

The present invention overcomes the foregoing and other shortcomings and drawbacks of sealing gaskets heretofore known for use in ventilation duct systems. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a sealing gasket is provided to form a generally air-tight seal between overlapping ends of first and second components of a ventilation duct system. The first component may be a sleeve coupling, an elbow, a reducer or other type of fitting commonly used in ventilation duct systems. The second component may be a ventilation duct run having a generally circular cross-sectional shape. The first and second components are interconnected at a joint by inserting a connection end of the first component into the receiving end of the second component so that the receiving end of the second component overlaps the connection end of the first component.

In one embodiment, the sealing gasket includes an annular gasket body that is configured to be disposed about the connection end the first duct component. The gasket body has, in axial cross-section, a generally flat top wall and a curved or, alternatively, a radiused bottom wall. The bottom wall may have a generally constant radius of curvature although other curved or arcuate shapes of the bottom wall are contemplated as well. The gasket body has a pair of circumferential edges that define the width of the sealing gasket.

In one embodiment, the sealing gasket includes a pair of annular sealing flanges that extend radially outwardly from the top wall of the gasket body. One of the sealing flanges is positioned adjacent one of the circumferential edges and the other sealing flange is positioned axially spaced from or offset from the opposite circumferential edge. In one embodiment, the sealing flanges extend generally perpendicular to the top wall and each sealing flange has a pair of side walls that are generally parallel.

A recessed formation is provided in the connection end of the first component. The formation includes a cylindrical portion having an outer diameter which is less than the maximum diameter of the connection end. An annular shoulder portion is positioned axially inwardly of the cylindrical portion and extends between the cylindrical portion and the maximum outer diameter of the connection end. An annular gasket seat, such as a radially inwardly extending annular bead, is positioned axially outwardly of the cylindrical portion and spaced from the free end of the first component.

The sealing gasket is snugly positioned within the gasket seat with the pair of sealing flanges extending radially outwardly beyond the maximum outer diameter of the connection end. The sealing flanges engage with an inner surface of the second component as the connection end of the first component is inserted into the receiving end of the second component. The sealing flanges bend or flex axially inwardly in response to engagement with the inner surface of the second component to form the generally air-tight seal at the joint.

In an alternative embodiment of the present invention, the sealing gasket includes an annular bead extending inwardly from the bottom wall of the gasket body. The first component includes an annular bead extending radially inwardly from the gasket seat. When the gasket body is positioned within the gasket seat, the annular bead is positioned within the annular bead. During insertion of the connection end of the first component into the receiving end of the second component, the annular bead of the gasket body cooperates with the annular bead of the gasket seat to minimize rolling or other undesirable axial movement of the sealing gasket out of engagement with the gasket seat.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description of an embodiment given below, serve to explain the principles of the present invention.

DETAILED DESCRIPTION OF THE INVENTION

Figure 1:
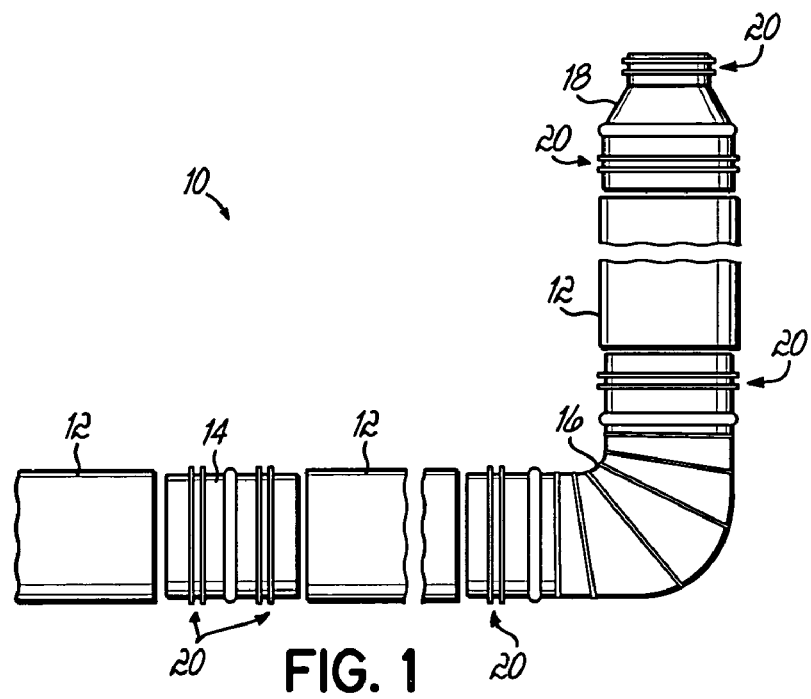
FIG. 1 is a side elevational view of an exemplary ventilation duct system incorporating the sealing gasket of the present invention for forming a generally air tight seal at the joints of the ventilation duct components.
Figure 2:
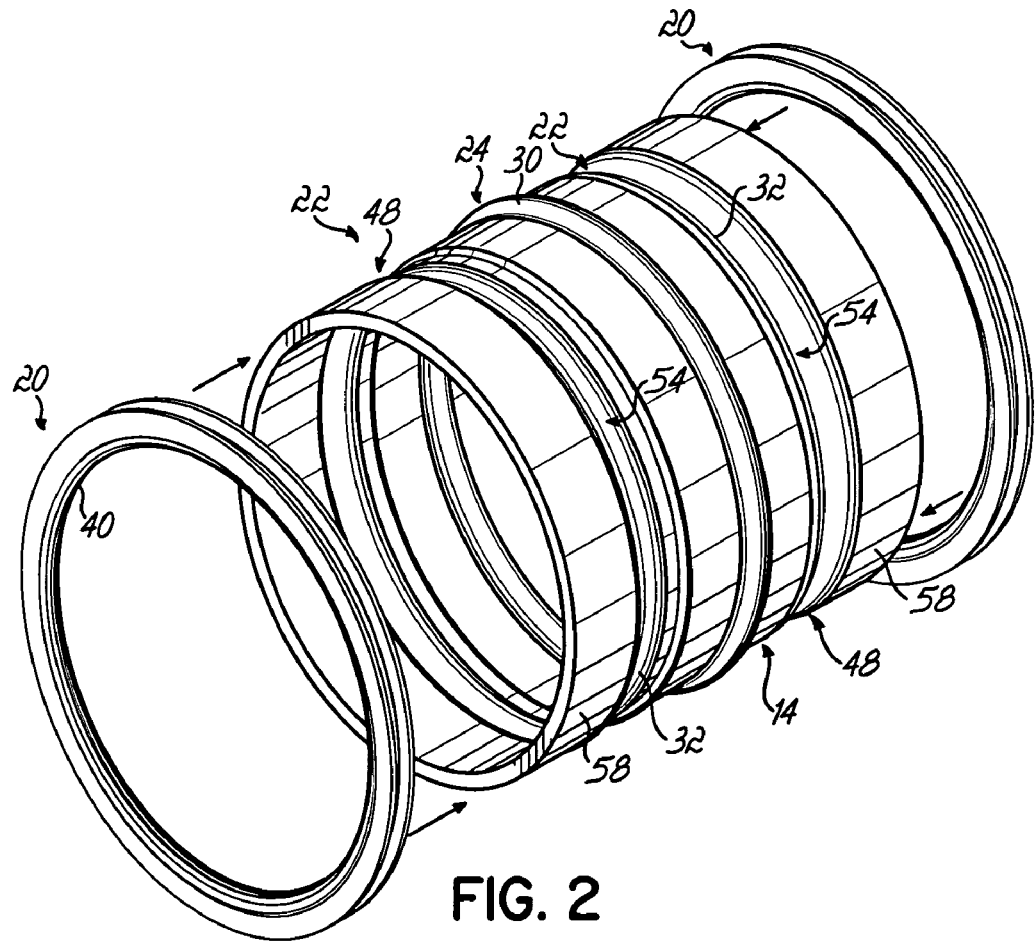
FIG. 2 is an exploded perspective view of a sleeve coupling and a pair of sealing gaskets according to one embodiment of the present invention for use in the ventilation duct system of FIG. 1.

Referring now to the figures, and to FIG. 1 in particular, an exemplary ventilation duct system 10 is shown in accordance with the principles of the present invention. The duct system 10 is shown including various types of duct components such as, by way of example, multiple ventilation duct runs 12, a sleeve coupling 14, an elbow 16 and a reducer 18 which are interconnected at joints to form the duct system 10. As will be described in greater detail below, sealing gaskets 20 are provided at the joints so as to form a generally air tight seal at each joint of the duct system 10. While the exemplary ventilation duct system 10 is shown including duct components 12, 14, 16 and 18, it will be appreciated that other types and configurations of duct components well known to those of ordinary skill in the art are possible as well without departing from the spirit and scope of the present invention.

Figure 3A:
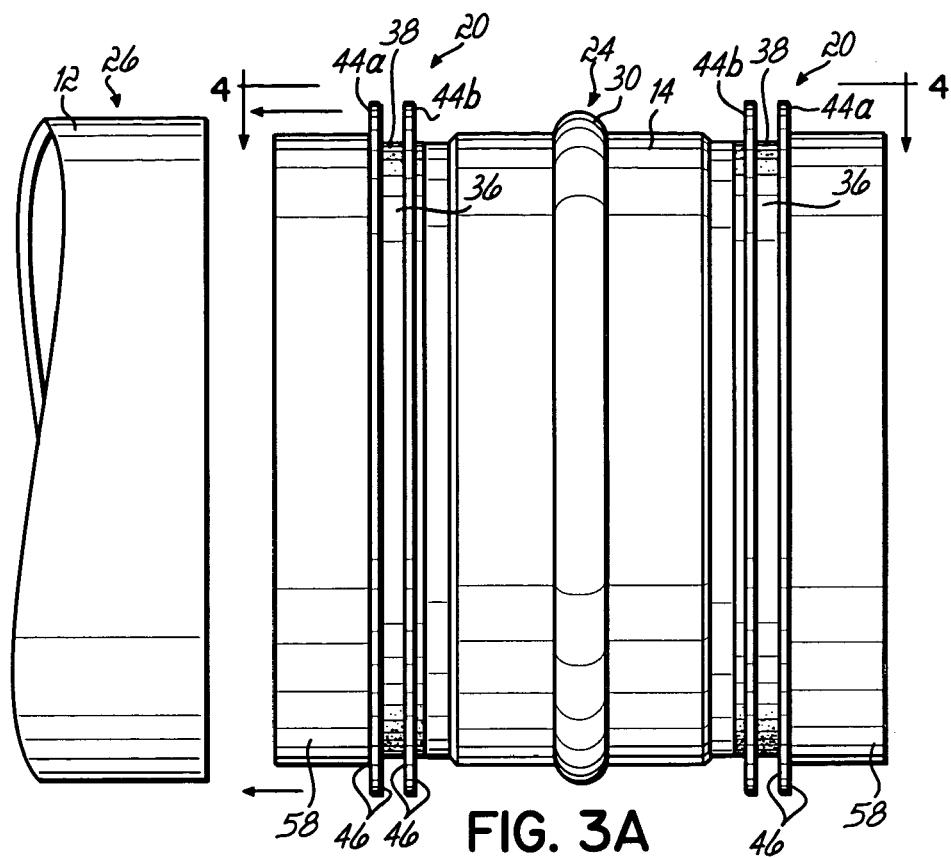
FIGS. 3A and 3B are side elevational views of the sleeve coupling and sealing gaskets shown in FIG. 2, illustrating assembly of the sleeve coupling with other duct components of the ventilation duct system of FIG. 1.
Figure 3B:
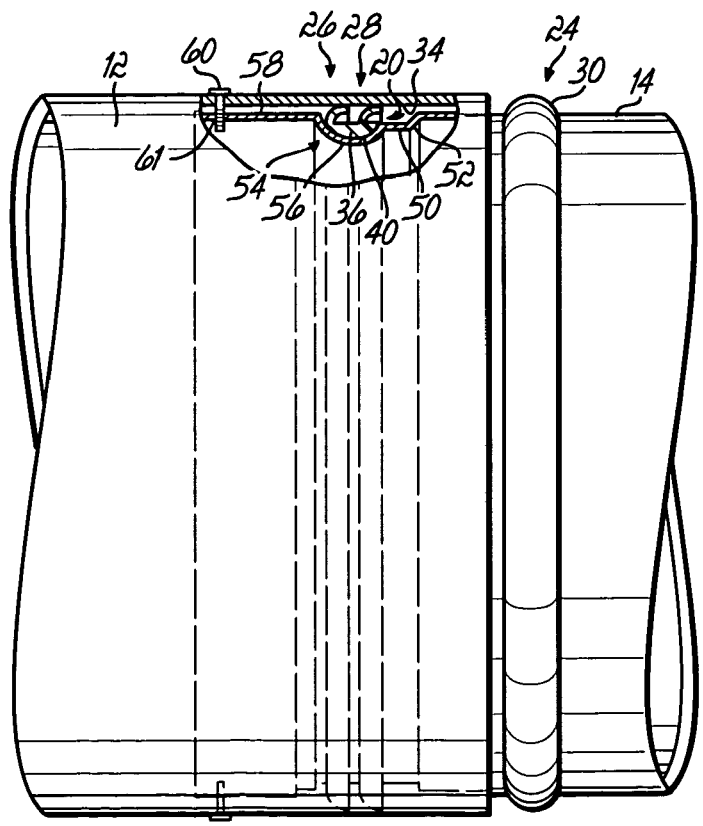

The present invention will now be described in connection with the sleeve coupling 14 shown in FIGS. 1, 2, 3A-3B and 4. In one embodiment, the sleeve coupling 14 comprises a tubular metal sleeve having a pair of opposite connection ends 22 of generally circular cross-section and a central stop region 24 therebetween. Each connection end 22 of the sleeve coupling 14 is configured to be inserted into a generally circular receiving end 26 of a conventional duct run 12 as shown in FIGS. 3A and 3B so that the receiving end 36 overlaps the connection end 22. In this way, adjacent ends of a pair of duct runs 12 are connected by the coupling sleeve 14 at a pair of joints (one shown in FIG. 3B) which are formed by the connection ends 22 of the sleeve coupling 14 and the overlapping receiving ends 26 of the duct runs 12. The central stop region 24 comprises a radially outwardly directed annular bead 30 which abuts the receiving ends 26 of the duct runs 12 to thereby limit the insertion depth of the sleeve coupling 14 within the receiving ends 26 of the duct runs 12.

According to one aspect of the present invention, a sealing ring or gasket 20 is provided at each joint 28 to form a generally air tight seal between each connection end 22 of the sleeve coupling 14 and the respective overlapping receiving ends 26 of the pair of duct runs 12. As shown in FIG. 3B, each sealing gasket 20 is configured to form a seal between an outer surface 32 of the connection ends 22 and inner surfaces 34 (FIG. 3B) of the respective overlapping receiving ends 26 of the duct runs 12.

In one embodiment, each sealing gasket 20 is formed from a synthetic or natural rubber or similar material which is resiliently deformable. The sealing gaskets 20 may be supplied as pre-formed rings sized to fit a particular diameter of a duct component. Alternatively, the sealing gaskets 20 may be supplied in rolls of indeterminate length suitable for being cut into strips as required so that they may have their ends effectively cemented or fused or otherwise joined together.

Figure 4:
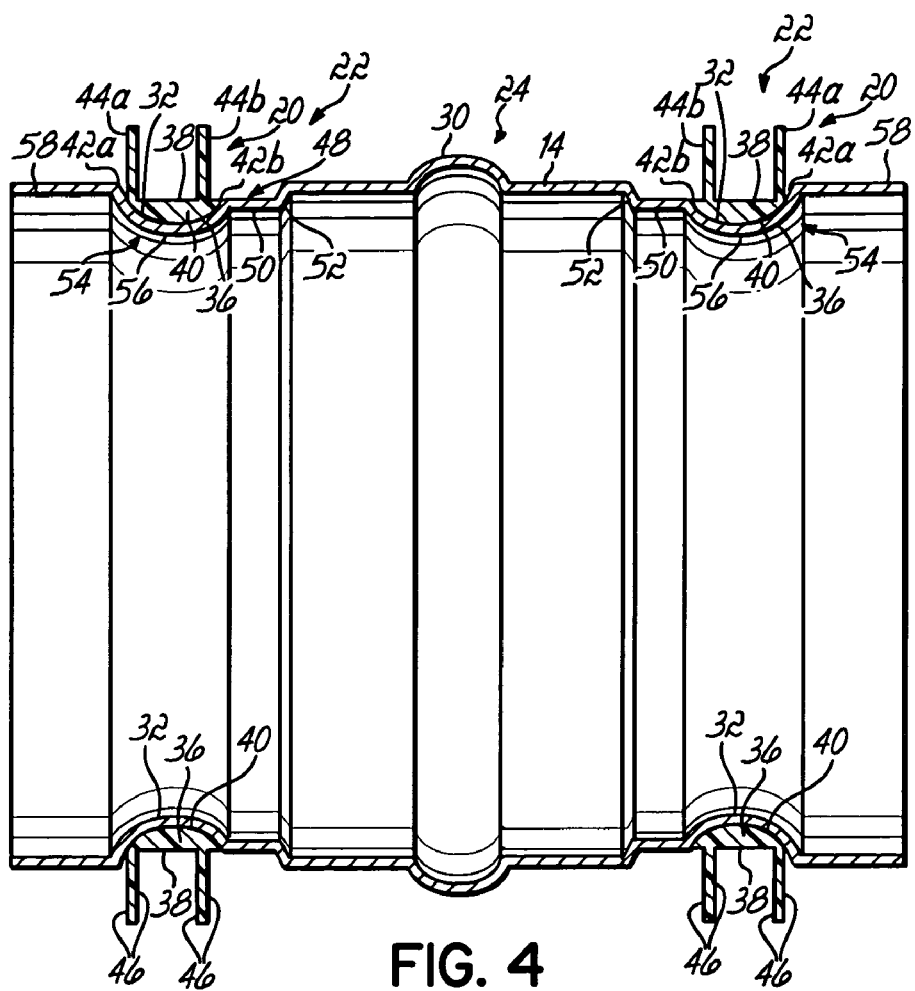
FIG. 4 is a cross-sectional view taken along line 4-4 of FIG. 3A.

In one embodiment as shown in FIG. 4, each sealing gasket 20 includes an annular gasket body 36 that is configured to be disposed about one of the respective connection ends 22 of the sleeve coupling 14 such as by rolling or snapping the sealing gasket 20 into snug engagement with the connection ends 22. The annular gasket body 36 has, in axial cross-section, a radially outwardly-most aspect that defines a generally flat top wall 38 and a radially inwardly-most aspect that defines a curved or, alternatively, a radiused bottom wall 40. The bottom wall 40 may have a generally constant radius of curvature although other curved or arcuate shapes of the bottom wall 40 are contemplated as well. The annular gasket body 36 of the sealing gasket 20 also has a pair of opposite circumferential edges 42a and 42b that define the width of the sealing gasket 20.

Each sealing gasket 20 is configured as a double lip seal in one embodiment and includes a pair of annular sealing flanges 44a and 44b that extend radially outwardly from the top wall 38 for engagement with the respective inner surfaces 34 of the overlapping receiving ends 26 of the duct runs 12 as shown in FIG. 3B. In one embodiment, one or both of the sealing flanges 44a and 44b extend generally perpendicular to the top wall 38. The sealing flange 44a is positioned adjacent the circumferential edge 42a and the sealing flange 44b is positioned axially spaced from or offset from the opposite circumferential edge 42b. In an alternative embodiment, one or both of the sealing flanges 44a and 44b may have a pair of side walls 46 that are generally parallel, although subject to a slight tapering that may result from the gasket molding process. In this alternative embodiment, one or both of the sealing flanges 44a and 44b may extend generally perpendicular to the top wall 38, although this is not required.

Further referring to FIG. 4, and in accordance with another aspect of the present invention, each connection end 22 of the sleeve coupling 14 is provided with a recessed formation, indicated generally at 48, which is roll formed onto the connection ends 22 using a convention roll forming or other suitable process. As shown in FIG. 4, each formation 48 includes a cylindrical portion 50 having an outer diameter which is less than the maximum outer diameter of the connection ends 22. An annular shoulder portion 52 is positioned axially inwardly of the cylindrical portion 50 and extends between the cylindrical portion 50 and the maximum outer diameter of the connection ends 22. An annular gasket seat 54 is positioned axially outwardly of the cylindrical portion 50 and spaced from the free end of the sleeve coupling 14. The gasket seat 54 may comprise a radially inwardly extending annular bead 56 as shown in FIG. 4. In one embodiment, a cylindrical portion 58 having the maximum outer diameter of the connection ends 22 is positioned axially outwardly of the gasket seat 54 and extends from the gasket seat 54 to the free end of the sleeve coupling 14. As used herein, the term "axially outwardly" refers to an axial direction toward a free end of the sleeve coupling 14 and, conversely, "axially inwardly" refers to an axial direction away from a free end of the sleeve coupling 14.

Further referring to FIG. 4, each gasket body 36 is snugly positioned within a respective gasket seat 54. In one embodiment, the top wall 38 of each gasket body 36 is generally co-extensive with the outer diameter of the cylindrical portion 50. The sealing flanges 44a and 44b extend radially outwardly beyond the maximum outer diameter of the connection ends 22 so as to be engageable with the inner surfaces 34 of the overlapping receiving ends 26 of the duct runs 12. As the connection ends 22 of the sleeve coupling 14 are inserted into the respective receiving ends 26 of the duct runs 12, the upper portions of the sealing flanges 44a and 44b bend or flex axially inwardly in response to engagement with the inner surface 34 to form the generally air-tight seal at the joint as shown in FIG. 3B.

The sealing flanges 44a and 44b may have the same height and the axial distance between the sealing flanges 44a and 44b may be greater than the axial distance between the sealing flange 44b and the circumferential edge 42b. The configurations of the recessed formation 48 and the sealing gasket 20 permit the sealing flanges 44a, 44b to bend or flex axially inwardly as shown in FIG. 3B to form a reliable and effective seal without the sealing flanges 44a, 44b becoming pinched between the connection ends 22 and the overlapping receiving ends 26 of the duct runs 12.

Further referring to 3B, the connection ends 22 of the sleeve coupling 14 and the receiving ends 26 of the duct runs 12 are mechanically connected together through fasteners 60, such as screws by way of example, that extend fully through the connection ends 22 of the sleeve coupling 14 and the overlapping receiving ends 26 of the duct runs 12. The fasteners 60 include washers or gaskets (not shown) that form a generally air-tight seal with the outer surface of the receiving ends 26 at the locations of the fasteners 60. The fasteners 60 create holes 61 through the connection ends 22 of the sleeve coupling 14 that are susceptible to air leakage.

In accordance with another aspect of the present invention, the fasteners 60 are positioned axially outwardly of the gasket seats 54 so as to extend through the cylindrical portions 58 of the sleeve coupling 14. In this way, the fasteners 60 are positioned axially outwardly of the gaskets 20 so that any air leaking through the holes 61 will be sealed by gaskets 20 to minimize or eliminate undesired leakage of air from the duct system 10 resulting from use of the fasteners 60.

Figure 5:
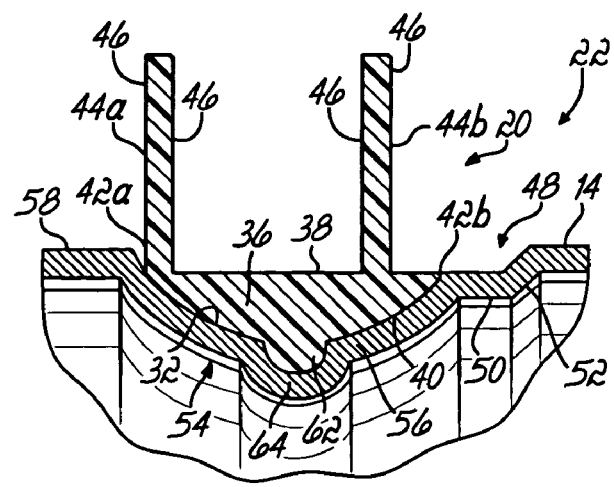
FIG. 5 is a partial cross-sectional view of a sleeve coupling and a sealing gasket according to an alternative embodiment of the present invention.

In an alternative embodiment of the present invention as shown in FIG. 5, the sealing gasket 20 includes an annular bead 62 extending radially inwardly from the bottom wall 40 of the gasket body 36. The sleeve coupling 14 includes an annular bead 64 extending radially inwardly from the gasket seat 54. When the gasket body 36 is positioned within the gasket seat 54, the annular bead 62 is positioned within the annular bead 64. During insertion of the connection ends 22 into the receiving end 26 of the duct runs 12, the annular bead 62 of the gasket body 36 cooperates with the annular bead 64 of the gasket seat 54 to minimize rolling or other undesirable axial movement of the sealing gasket 20 out of engagement with the gasket seat 54.

While the sealing gasket 20 of the present invention has been described in detail in connection with use on the sleeve coupling 14, those of ordinary skill in the art will readily appreciate that the sealing gasket 20 may be used on one or both ends of many other ventilation duct components as well. For example, as shown in FIG. 1, the sealing gasket 20 may be used on the connections ends of an elbow 16, a reducer 18 or any other duct component commonly used in ventilation duct systems.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

Having described the invention, what is claimed is:

1. A ventilation duct system, comprising:
   a first duct component;
   a second duct component; and
   a sealing gasket configured to form a seal between overlapping ends of the first and second components, the sealing gasket comprising:
      an annular gasket body disposed about one end of the first duct component, the gasket body having, in cross-section and in a relaxed state, a generally flat radially outer wall, a radiused radially inner wall opposite the radially outer wall and a pair of opposite circumferential edges, the radially inner wall being radiused substantially between the pair of opposite circumferential edges;
      a first annular sealing flange extending radially outwardly from and generally perpendicular to the radially outer wall and positioned effectively at one of the circumferential edges;
      a second annular sealing flange extending radially outwardly from and generally perpendicular to the radially outer wall and positioned axially spaced from the opposite circumferential edge; and
      an annular bead extending radially inwardly from the radially inner wall of the gasket body.

2. The ventilation duct system of claim 1 wherein the radially inner wall has a generally constant radius of curvature.

3. The ventilation duct system of claim 1 wherein the first sealing flange has a pair of oppositely disposed side walls that are generally parallel along the entire longitudinal length of the first sealing flange.

4. The ventilation duct system of claim 3 wherein the second sealing flange has a pair of oppositely disposed side walls that are generally parallel along the entire longitudinal length of the second sealing flange.

5. The ventilation duct system of claim 1 wherein the second sealing flange has a pair of oppositely disposed side walls that are generally parallel along the entire longitudinal length of the second sealing flange.

6. The ventilation duct system of claim 1 further comprising a formation provided on the one end of the first duct component, the formation comprising:
   a cylindrical portion having an outer diameter which is less than an outer diameter of the one end of the first duct component;
   a shoulder portion positioned axially inwardly of the cylindrical portion; and
   an annular gasket seat positioned axially outwardly of the cylindrical portion, the sealing gasket being positioned within the gasket seat.

7. The ventilation duct system of claim 6 wherein the gasket seat comprises a first annular bead.

8. The ventilation duct system of claim 7 further comprising a second annular bead extending radially inwardly from the first annular bead.

9. The ventilation duct system of claim 8 wherein the annular bead of the gasket body is positioned within the second annular bead.

10. The ventilation duct system of claim 6 wherein the radially outer wall of the sealing gasket is generally co-extensive with the outer diameter of the cylindrical portion.

11. The ventilation duct system of claim 1 further comprising a fastener positioned axially outwardly of the sealing gasket and extending through the overlapping ends of the first and second duct components.

12. A ventilation duct system, comprising:
   a first duct component;
   a second duct component; and
   a sealing gasket configured to form a seal between overlapping ends of the first and second components, the sealing gasket comprising:
      an annular gasket body disposed about one end of the first duct component, the gasket body having, in cross-section and in a relaxed state, a generally flat radially outer wall, a radiused radially inner wall opposite the radially outer wall and a pair of opposite circumferential edges, the radially inner wall being radiused substantially between the pair of opposite circumferential edges;
      a first annular sealing flange extending radially outwardly from the radially outer wall and positioned effectively at one of the circumferential edges, the first sealing flange having a pair of oppositely disposed side walls that are generally parallel along the entire longitudinal length of the first sealing flange;
      a second annular sealing flange extending radially outwardly from the radially outer wall and positioned axially spaced from the opposite circumferential edge, the second sealing flange having a pair of oppositely disposed side walls that are generally parallel along the entire longitudinal length of the second sealing flange; and
      an annular bead extending radially inwardly from the radially inner wall of the gasket body.

13. The ventilation duct system of claim 12 wherein the radially inner wall has a generally constant radius of curvature.

14. The ventilation duct system of claim 12 further comprising a formation provided on the one end of the first duct component, the formation comprising:
   a cylindrical portion having an outer diameter which is less than an outer diameter of the one end of the first duct component;
   an annular shoulder portion positioned axially inwardly of the cylindrical portion; and
   an annular gasket seat positioned axially outwardly of the cylindrical portion, the sealing gasket being positioned within the gasket seat.

15. The ventilation duct system of claim 14 wherein the gasket seat comprises a first annular bead.

16. The ventilation duct system of claim 15 further comprising a second annular bead extending radially inwardly from the first annular bead.

17. The ventilation duct system of claim 16 wherein the annular bead of the gasket body is positioned within the second annular bead.

18. The ventilation duct system of claim 14 wherein the radially outer wall of the sealing gasket is generally co-extensive with the outer diameter of the cylindrical portion.

19. The ventilation duct system of claim 14 further comprising a fastener positioned axially outwardly of the sealing gasket and extending through the overlapping ends of the first and second duct components.

20. A ventilation duct system, comprising:
   a first duct component;
   a second duct component; and
   a sealing gasket configured to form a seal between overlapping ends of the first and second components, the sealing gasket comprising:
      an annular gasket body disposed about one end of the first duct component, the gasket body having, in cross-section and in a relaxed state, a generally flat radially outer wall, a curved radially inner wall opposite the radially outer wall and a pair of opposite circumferential edges, the radially inner wall being curved substantially between the pair of opposite circumferential edges;
      a first annular sealing flange extending radially outwardly from the radially outer wall and positioned effectively at one of the circumferential edges, the first sealing flange having a pair of oppositely disposed side walls that are generally parallel along the entire longitudinal length of the first sealing flange;
      a second annular sealing flange extending radially outwardly from the radially outer wall and positioned axially spaced from the opposite circumferential edge, the second sealing flange having a pair of oppositely disposed side walls that are generally parallel along the entire longitudinal length of the second sealing flange; and
      an annular bead extending radially inwardly from the radially inner wall of the gasket body.

21. The ventilation duct system of claim 20 wherein the first sealing flange extends generally perpendicular to the radially outer wall.

22. The sealing gasket of claim 21 wherein the second sealing flange extends generally perpendicular to the radially outer wall.

23. The ventilation duct system of claim 20 wherein the second sealing flange extends generally perpendicular to the radially outer wall.

24. The ventilation duct system of claim 20 further comprising a formation provided on the one end of the first duct component, the formation comprising:
   a cylindrical portion having an outer diameter which is less than an outer diameter of the one end of the first duct component;
   a shoulder portion positioned axially inwardly of the cylindrical portion; and
   an annular gasket seat positioned axially outwardly of the cylindrical portion, the sealing gasket being positioned within the gasket seat.

25. The ventilation duct system of claim 24 wherein the gasket seat comprises a first annular bead.

26. The ventilation duct system of claim 25 further comprising a second annular bead extending radially inwardly from the first annular bead.

27. The ventilation duct system of claim 26 wherein the annular bead of the gasket body is positioned within the second annular bead.

28. The ventilation duct system of claim 24 wherein the radially outer wall of the sealing gasket is generally co-extensive with the outer diameter of the cylindrical portion.

29. The ventilation duct system of claim 20 further comprising a fastener positioned axially outwardly of the sealing gasket and extending through the overlapping ends of the first and second duct components.

* * * * *